Inventors
John D. Grigsby
James R. Jeromson Jr.

Aug. 14, 1962  J. D. GRIGSBY ET AL  3,048,976
BRAKE CONTROL SYSTEM
Filed Aug. 25, 1958  2 Sheets-Sheet 2

Inventors
John D. Grigsby
James R. Jeromson Jr.

United States Patent Office 3,048,976
Patented Aug. 14, 1962

3,048,976
BRAKE CONTROL SYSTEM
John D. Grigsby, Willoughby, and James R. Jeromson, Jr., Willoughby Hill, Ohio
Filed Aug. 25, 1958, Ser. No. 756,881
12 Claims. (Cl. 60—54.5)

This invention relates to a brake control system. More particularly, this invention relates to a control system for an electric motor powered hydraulic brake actuator suitable for use on house trailers, trucks, and the like. Since it is necessary that such a system be under the command of the tractor operator, a remote control positioned in the cab or driver's compartment is included to electrically control the hydraulic brake system of the trailer.

It is a feature of this invention to provide an electrically controlled hydraulic brake actuating system suitable for use in a tractor trailer combination and including a control in the operator's cab by which the brake pressure may be continuously adjusted from the fully off condition through a wide range of values to the fully on condition. In such a system the reliability and life expectancy of the components used are critical since a failure of any vital control element may result in a failure of the entire system with consequent damage or destruction of life and property. It is thus a feature of the present invention to provide such a system utilizing control components which are simple, rugged, durable, and dependable in operation. The system is entirely mechanical and electromagnetic in its operation and does not depend upon any fragile electronic components which may be subject to failure in use. At the same time, the system affords a high degree of accuracy and flexibility of control.

It is therefore an object of this invention to provide a control system for an electric motor powered hydraulic brake actuator.

It is a further object of this invention to provide such a system utilizing simple and rugged electromechanical components which afford a high degree of durability and reliability in operation.

It is a further object of this invention to provide such a system affording a high degree of accuracy and flexibility of control.

It is a further object of this invention to provide such a system in which the brake pressure may be continuously varied over a wide pressure range by actuation of a remote electrical control.

Other objects, features, and advantages of the present invention will be more fully apparent from the following detailed description taken in conjunction with the accompanying drawings in which like reference characters refer to like parts throughout and wherein.

Figure 1:
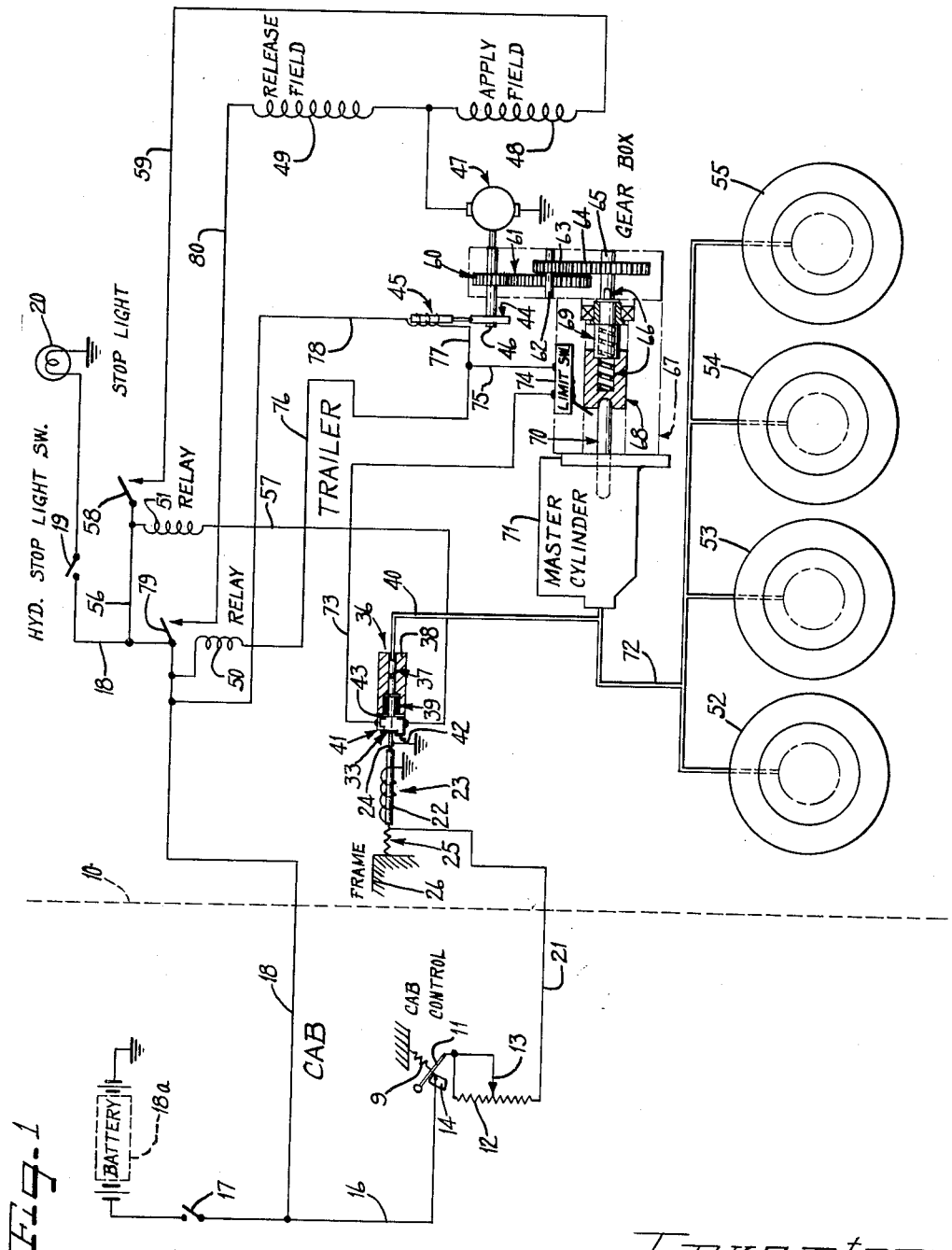
FIGURE 1 is a schematic electrical circuit and mechanical diagram of the system of the present invention.

Turning now to the drawings and in particular to FIGURE 1 thereof, there is shown a schematic diagram of the hydraulic brake actuator control system, the portion to the right of the dashed line 10 being normally contained in the trailer or other vehicle to be braked and the portion to the left of the dashed line 10 being mounted in the cab of the tractor or in any other remote driving or operating location. The operator's control normally located in the cab includes a single pole single throw switch having an arm 11 and a rheostat 12 the wiper arm 13 of which is mechanically ganged to the switch arm 11. The switch arm 11 is adapted to close on an extended contact 14. The switch and rheostat are so arranged that the rheostat is in the high resistance position when the switch is open as shown in FIGURE 1. As the control lever or switch arm 11 is moved downwardly, the switch closes. Additional downward movement of the control lever removes resistance from the rheostat circuit as more and more of the resistance thereof is shorted out by the rheostat arm 13 which is directly connected to switch arm 11. The switch cannot re-open until the rheostat is returned to the high resistance position. The operating lever or arm 11 is spring loaded by a spring 19 connected to any suitable fixed member so that the rheostat and switch will return to the off position when it is released by the operator.

Contact 14 is connected by lead 16 through a main or master two position on-off switch 17 to the positive side of a battery 18a or other source of unidirectional voltage. The negative side of battery 18a is grounded as shown. It will of course be apparent that when switch 17 is closed, the closing of control lever or switch arm 11 on contact 14 connects battery 18a in series with that portion of the resistance of rheostats 12 which is not shorted out by the rheostat arm 13. Switch 17 is also connected by a lead 18 through a hydraulically operated stoplight switch 19 to the stoplight 20 on the trailer. The other side of stoplight 20 is grounded as shown. Switch 19 is operated by a hydraulic line (not shown) in such a manner that when hydraulic pressure is applied to the brakes it is closed to give the conventional signal that brakes are being applied.

The other end of rheostat 12 is connected by lead 21 to one end of the coil 22 of a control solenoid 23. The other end of coil 22 is grounded as shown. The control solenoid 23 (and an associated feed-back hydraulic pressure sensing unit to be described below) are shown in greater detail in FIGURE 2 and the operating characteristics of the solenoid are shown by the force-stroke curves of the graph of FIGURE 3.

Figure 3:
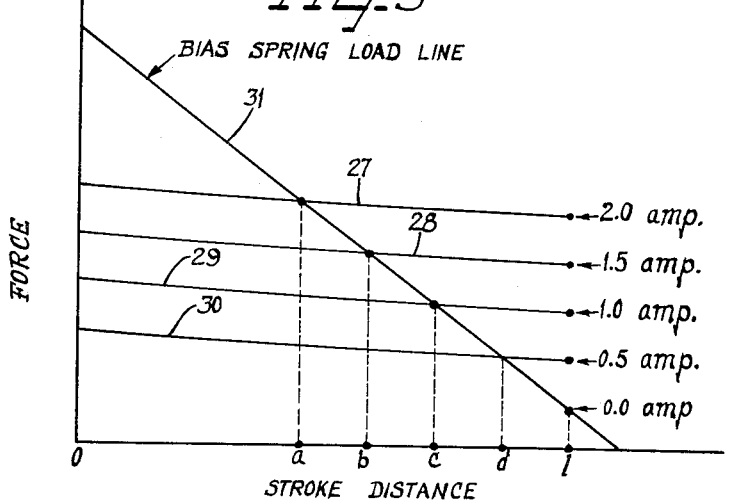
FIGURE 3 is a graph of the operating characteristics of the control solenoid shown in FIGURE 2 in which the stroke distance of the solenoid plunger is plotted as abscissa against the force applied to the plunger plotted as ordinate.

The control solenoid 23 is a traction solenoid of such design that the plunger force is nearly constant throughout the working stroke with constant coil current. This force, however, increases with increasing coil current as shown by the force-stroke curves of FIGURE 3. The solenoid plunger is biased by a spring 25 which is attached to plunger 24 and is under compression between the plunger and any suitable rigid frame member 26. The spring acts in opposition to the magnetically induced motion of the solenoid plunger. The spring load line 31 as shown in FIGURE 3 and the solenoid characteristic or load lines 27, 28, 29 and 30 intersect at unique equilibrium positions for any given solenoid coil current. Of course, the current in the coil 22 is determined by the setting of the cab control lever arm 11 controlling rheostat 12 in series with this coil. If the plunger is not in the equilibrium position, a force will exist which tends to drive the plunger to the equilibrium position. The magnitude of the equilibrium seeking force is large when the plunger is far from equilibrium and becomes smaller as equilibrium is approached. Because the near equilibrium force is small, the plunger friction must be kept small. The required low frictional force is obtained by covering the solenoid plunger with a self-lubricating solid resinous polymer such as "Teflon." This material is commercially available in the form of a tape having an adhesive on one side thereof by means of which the tape may be wrapped around the plunger. The material is denoted as self-lubricating since it has the property when sliding over a dissimilar material (such as the brass bore insert of the solenoid) that particles of the "Teflon" will rub off on the dissimilar material and in effect will result in "Teflon" sliding on "Teflon." The published value for both the coefficients of sliding friction and of static friction of "Teflon" on "Teflon" is 0.04. The fact that this value applies to both static and sliding conditions prevents any slip-stick phenomenon in the response of the solenoid plunger to variations in coil current and affords a highly sensitive control action.

Figure 2:
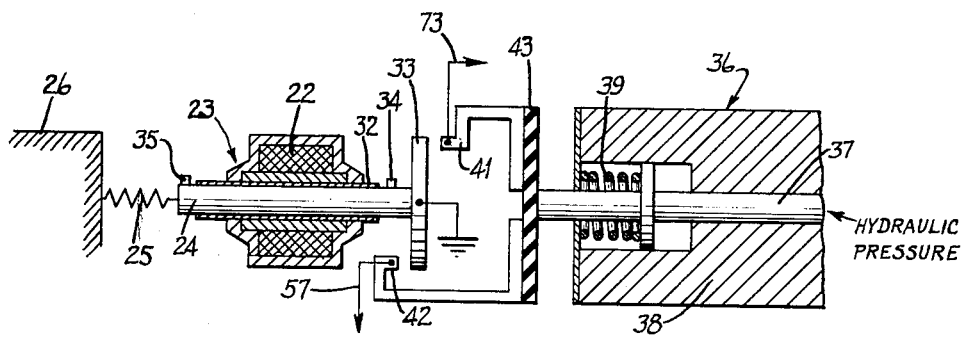
FIGURE 2 is a more detailed view of the control solenoid and hydraulic feed-back unit shown in FIGURE 1.

A disc shaped electrical contact member 33 is rigidly attached to one end of the solenoid plunger. This contact is the grounded side of the sensing control, the contact being grounded as shown in FIGURE 2 by any suitable means. The disc shape is used because the solenoid plunger is free to rotate and is intended to maintain a predetermined geometrical relationship with other contacts to be described below. Adjustable mechanical stops 34 and 35 may be provided in the control solenoid to limit the plunger travel.

The control solenoid 23 cooperates in its action with a hydraulic feed-back or hydraulic pressure sensing unit 36. This unit consists of a movable hydraulic piston 37 which is mounted for slidable motion in the bore of a housing 38 and which is spring loaded by a spring 39 mounted in a recess in the housing so that the piston motion is proportional to the brake line pressure which is applied to the other end of the piston through line 40. Two mutually insulated electric contacts 41 and 42 respectively are fastened to the movable hydraulic piston 37 by means of an insulating yoke member 43. The two contacts 41 and 42 are mounted on yoke 43 in such a fashion that the contacts are positioned one on each side of the solenoid plunger disc contact 33. That is to say, the axis of the plunger of the solenoid is aligned with the axis of the piston of the hydraulic feed-back unit and the disc contact 33 is mounted perpendicularly to this common axis as is the yoke member 43 carrying contacts 41 and 42. These contacts 41 and 42 are axially displaced one in front of and one behind the disc contact 33 in its motion along the common axis of the plunger and the piston. The contacts are spaced apart from each other a distance slightly greater than the thickness of the disc contact. As noted, the hydraulic feed-back unit and the control solenoid are mounted on the same axis. The hydraulic piston motion with increasing brake line pressure is in the same direction as the solenoid plunger motion with increasing coil current.

A holding brake 44 of the self-energizing unidirectional type is connected to be released by a solenoid 45. This holding brake is connected to operate upon the shaft 46 of a motor 47 which controls the application of hydraulic pressure to the main braking system and which is in turn controlled by excitation of field windings 48 and 49. The winding 48 is considered the "apply field" since it rotates motor 47 in a direction to apply hydraulic pressure to the braking system whereas the winding 49 is considered as the "release field" since it rotates the motor 47 in a direction to release hydraulic pressure from the main braking system. The release solenoid 45 is energized whenever the drive motor 47 release field 49 is energized. The hold brake 44 acts on the drive motor shaft 46 and absorbs the reverse torque developed by the brake line pressure when the drive motor is de-energized. Two high current handling D.-C. relays 50 and 51 are used to amplify the control signal sufficiently to operate the drive motor. The drive motor 47 is a high output intermittant duty reversible D.-C. motor. The two separate fields 48 and 49 are used to obtain the reversible feature.

Normally, the cab control lever 11 is in the open or released position and no braking action is applied to the brakes of the wheels 52, 53, 54, and 55 of the trailer or other vehicle to be braked. To apply the brakes, the driver moves the cab control lever 11 to the desired position, the braking effort produced at the wheels of the trailer being proportional to the setting of arm 13 on rheostat 12 as determined by the position of lever 11. Movement of the lever 11 applied a voltage proportional to the setting of the lever to the coil 22 of solenoid 23. This voltage causes the plunger 24 to move to the left thereby taking up the clearance between the disc 33 and the "apply" contact 42. This movement compresses spring 25. When disc 33 and contact 42 engage, relay 51 is energized thus completing the circuit to the apply field of motor 47. The relay 51 is energized through a circuit including battery 18a, master switch 17, conductor 18 to which one end of the coil of relay 51 is attached by a conductor 56, the relay coil 51, and conductor 57 which connects the other end of coil 51 to the movable contact member 42. When the grounded disc 33 is moved by the control solenoid plunger into contact with the contact member 42 the ground connection completes the relay circuit back through the grounded side of battery 18a. The closing of contact arm 58 of relay 51 connects the apply field winding 48, one end of which is grounded, through a conductor 59 to conductors 56 and 18 and thence through switch 17 to battery 18a.

The contact of disc 33 and movable contact member 42 thereby energizes the apply field of motor 47 causing the motor to rotate its shaft 46 which in turn rotates a pinion 60 which in turn drives gear 61 on countershaft 62. Gear 63 is secured to the countershaft and thus rotates with gear 61. Gear 63 engages gear 64, which is secured to the shaft 65. A slot on shaft 65 engages a tang on screw 66. A key, secured to housing 67, sliding in a keyway in guide 68 prevents the recirculating ball nut 69 from rotating. Thus, as the screw 66 rotates, the nut 69 advances to the left pushing rod 70 to the left.

Rod 70 engages a piston in the hydraulic master cylinder 71 and as the piston moves to the left, hydraulic pressure is built up through conduit 72 to apply the hydraulic brakes at the wheels 52, 53, 54, and 55 of the trailer. The hydraulic pressure applied to the braking system through conduit 72 is also fed back through conduit 40 to the pressure sensing piston 37 and operates against spring 39. As noted, contact 42 is carried by piston 37. Thus, as pressure is built up by the motor 47 driving the mechanism discussed above, piston 37 and contact 42 move to the left, allowing the plunger 24 of solenoid 23 to proceed toward its equilibrium position commensurate with the setting of the cab control lever 11. This action continues until the spring force on spring 25 equals the electromagnetic force developed by the plunger of solenoid 23. At this equilibrium position, the solenoid plunger and, of course, disc 33 stop movement. The motor 47 continues to run and increases hydraulic pressure for an instant causing piston 37 to continue to move contact 42 to the left until electrical contact between contact 42 and disc 33 is broken. When this contact is broken, relay 51 is de-energized and, being spring biased to a normally open position, opens the circuit to shut off motor 47. Inertia of the rotating parts causes a sufficient further increase in hydraulic pressure to provide a clearance between contact 42 and disc 33 necessary to prevent arcing between these contacts. The brakes are now applied to the wheels of the trailer.

The efficiency of the mechanical components, that is, the recirculating ball nut and screw, spur gear reduction, is sufficiently high to cause the brake fluid pressure acting on the master cylinder piston to cause this mechanism to run backward in the absence of a means to prevent this action. This action is prevented by the differential band brake 44 located on the motor shaft 46. This band brake sets automatically with less than 5° reverse rotation of the motor shaft. Hence, the brakes can be held on with the motor 47 shut off.

If the operator desires increased braking effort at the wheels, he need only increase the setting of the cab control lever 11, and the cycle just described will be repeated and a new equilibrium position at a higher hydraulic fluid pressure will be reached by the control solenoid thereby resulting in increased braking effort at the wheels.

A reduction in braking effort is accomplished by decreasing the setting of the cab control lever 11. This reduces the voltage applied to the solenoid 23, thus reducing the electromagnetic force developed by the solenoid. Spring 25 pushes the plunger 24 carrying the disc 33 to the right toward its new equilibrium position thereby making electrical contact between disc 33 and contact 41. This energizes relay 50 which in turn closes the circuit to the release field coil 49 of motor 47. Simultaneously, solenoid 45 is energized and releases the brake 44.

The circuit through which relay 50 is energized includes the grounded disc 33, contact 41, conductor 73, a normally closed limit switch 74, conductor 75, conductor 76, the relay coil of relay 50, conductor 18, master switch 17, and the battery 18a. It will be noted that the coil of motor brake solenoid 45 is connected through conductors 77 and 78 in parallel with the coil of relay 50 and is thereby energized simultaneously with the energization of relay 50. The circuit through which the release field coil 49 of the motor 47 is energized by the closing of relay 50 includes battery 18a, conductor 18, arm 79 of relay 50, conductor 80, the release field coil 49 of motor 47 and thence back to ground. Thus, the motor 47 drives the mechanism backward and hydraulic pressure is reduced while piston 37 carrying contact 41 and the plunger of solenoid 23 move to the right. When the spring force of spring 25 equals the electromagnetic force on solenoid plunger 24 for the particular current value to which the control arm 11 is set, the plunger stops movement to the right. Motor 47, still running in reverse, continues to reduce hydraulic pressure causing piston 37 to move to the right until electrical contact between disc 33 and contact 41 is broken. Again, inertia of rotating parts provides an incremental reduction in hydraulic pressure sufficient to provide clearance between the disc 33 and contact 41 to prevent arcing. Thus, lesser braking effort is produced.

To completely release the brake, cab control lever 11 is released or opened and the above brake releasing sequence is repeated and continues until the limit switch 74 is opened thereby breaking the circuit to relay 50 and solenoid 45, thus turning off the reverse field of motor 47.

To summarize the operation of the system, when braking of the trailer or other vehicle is desired, the operator moves the cab control lever downward to close the cab control switch and advance the rheostat to give the desired amount of braking. Current then flows from the tractor battery through the cab control and control solenoid coil to ground. The position of the cab control rheostat determines the magnitude of the current which flows through the control solenoid coil. The control solenoid plunger moves toward the equilibrium position as determined by the magnitude of the current flowing in the solenoid coil and the biasing spring, but is prevented from reaching the equilibrium position by the contacting of the disc contact and the hydraulic feed-back contact. The control solenoid plunger does not exert enough force to move the feed back contact which is rigidly mounted on its yoke, but it does exert enough force to make good electric contact. The feed-back contact is therefore grounded through the disc contact which allows current to flow through the coil of relay 51. Relay 51 closes and connects the apply field of the drive motor 47 to the battery. The drive motor then turns and acts through the gear train and screw on the master cylinder piston which displaces fluid into the brake line, brakes, and the hydraulic feed-back unit. The hydraulic feed-back piston moves in response to the hydraulic pressure in a direction toward the control solenoid plunger equilibrium position. The control solenoid plunger follows the hydraulic feed-back piston motion and maintains the electrical contact between contact 42 and the disc contact 33 until the control solenoid equilibrium position is reached. When the equilibrium position is attained, the solenoid plunger stops. The hydraulic feed-back system continues to move, however, since the drive motor is still running and the brake line pressure is increasing. The continued motion of the hydraulic feed-back piston causes contact 42 to break contact with the disc contact which de-energizes relay 51 and disconnects the drive motor from the battery. In this condition, the "hold" brake is effective and prevents the gear train from reversing, and brake line pressure remains constant. The hydraulic feed-back system therefore stops. A brake line pressure now exists which is dependent on the position of the cab control lever. Additional downward motion of the cab control lever will cause an increase in brake line pressure by causing the control solenoid plunger to move and again initiate the above sequence.

The brake line pressure may be reduced by allowing the cab control lever to move upward which reduces the current flowing in a control solenoid coil. This reduces the force developed by the control solenoid plunger and allows the control solenoid spring to move the plunger toward a new equilibrium position. If the new equilibrium position is sufficiently far from the original equilibrium position, the disc contact will touch contact 41 before the new equilibrium position is reached. Contact 41 prevents the control solenoid plunger from reaching a new equilibrium position. When contact 41 is grounded by contact with disc contact 33, relay 50 is energized. Relay 50 connects the drive motor release field and the hold brake solenoid to the battery. The hold brake solenoid releases the hold brake and the drive motor runs in a direction which reduces the brake line pressure. As the brake line pressure decreases, the hydraulic feed-back piston is returned by its spring. The control solenoid plunger follows the hydraulic feed-back piston and maintains electrical contact with contact 41 until a new equilibrium is reached. The control solenoid plunger stops when the equilibrium position is reached, but the hydraulic feed-back piston and contact 41 continue to move so that the electrical contact between 41 and the disc contact 33 is broken. Relay 50 then drops out and disconnects the drive motor and the hold brake solenoid from the battery. This allows the motor to stop and the hold brake to become effective which prevents any further motion of the gear train and master cylinder piston.

Complete brake release is accomplished by allowing the cab control lever to return to its rest or open position. In this position the cab control switch is open and no current can flow in the control solenoid coil. The control solenoid spring returns the control solenoid plunger toward the hydraulic feed-back unit until the disc contact touches contact 41. The control solenoid spring does not exert enough force to move contact 41 but does exert enough force to make good electrical contact. When contact 41 is grounded through the disc contact, relay 50 is energized and connects the drive motor release field and the hold brake to the battery. The drive motor turns in a direction which allows the master cylinder piston to return to the brake off position which causes the brake line pressure to fall. The reduced brake line pressure allows the hydraulic feed-back piston to return to its off stop. The control solenoid plunger follows the hydraulic feed-back piston and maintains electrical contact between the disc contact and contact 41. When the mechanism reaches the off position the limit switch 74 is opened which de-energizes relay 50. Relay 50 then disconnects the drive motor and the hold brake solenoid from the battery. The hold brake thereafter prevents any further rotation of the shaft of motor 47. In the off condition the brake actuator draws no current.

While the control system has been described in its application to a hydraulically operated tractor brake system, it will of course be understood that it may also be used to afford a remote electrical control for any hydraulically operated apparatus wherein it is desired to provide a control affording a continuous adjustment of hydraulic pressure through a predetermined range of values.

Furthermore, while the principles of the invention have now been made clear, there will be immediately obvious to those skilled in the art, many modifications in structure, arrangement, proportions, the elements and components used in the practice of the invention and otherwise, which are particularly adapted for specific environments and operating requirements without departing from those principles. The appended claims are therefore intended to cover and embrace any such modifications within the limits only of the true spirit and scope of the invention.

We claim as our invention:

1. An electric motor powered hydraulic brake actuator remotely controlled through electrical connections to be suitable for use in tractor-trailers and the like comprising, a hydraulically operated brake system, electric motor operated means to variably apply the actuating hydraulic pressure in said system, means for controlling said motor including electrical contacts relatively movable between different operative positions, means responsive to said actuating hydraulic pressure to vary the relative position of said contacts, a control solenoid having a coil, a plunger and biasing means therefor, remote control means electrically connected to supply variably selected currents to said coil, the plunger of said solenoid being connected to vary the relative position of said electrical contacts between their different operative positions and having a variable equilibrium position determined by the relative magnitude of the opposing forces exerted on said plunger by said biasing means and by the magnetic field generated by the selected current flowing in said coil, and said means for controlling said electric motor including circuit means connected to actuate said motor in one direction to increase said hydraulic pressure in one operative position of said electrical contacts and to actuate said motor in the other direction to decrease said hydraulic pressure in the other operative position of said contacts.

2. Electrically operated means to variably control the pressure in a hydraulic system comprising, electrically operated means to increase or decrease said pressure, electrical contacts relatively movable between two operative positions, means responsive to hydraulic pressure to relatively move said contacts, a control responsive solenoid having a coil, a plunger, and bias means therefor, means to apply current to said coil, the plunger of said solenoid being operatively connected to variably move said contacts and having a variable equilibrium position determined by the relative magnitude of the imposing forces exerted on said plunger by said biasing means and by the magnetic field generated by said current flowing in said coil, circuit means including said movable contacts connected to actuate said electrical means to increase said hydraulic pressure in one operative position of said contacts and to decrease said hydraulic pressure in a different operative position of said contacts, and control means to vary the magnitude of the current in said coil to any selected value to determine the equilibrium position of said plunger and to thereby determine the selected magnitude of said hydraulic pressure.

3. Electrically operated means to variably control the range of pressures in an hydraulic actuating system to any selected value comprising, electrically actuated means to rapidly increase or decrease said hydraulic pressure, feedback means connected to sense said hydraulic pressure, first electrical circuit means connected to be controlled in accordance with the magnitude of the hydraulic pressure sensed by said feedback means, second electrical circuit means variably and remotely adjustable to correspond to any one of a number of predetermined and desired selected electrical values for said hydraulic pressure, and said first and second electrical means co-acting and connected to control said electrically actuated means to increase or decrease said hydraulic pressure to match said desired selected value.

4. Remote control and electrically operated means to infinitely variably control the range of pressures in a hydraulic actuating system to any remotely selected value and to maintain said selected pressure constant therewith comprising, feed back motor means to sense any value of said hydraulic pressure and move to a position corresponding thereto, interacting electrical contact means relatively movable between different operative positions, a remote control member adjustable to set any predetermined desired electrical value to determine a corresponding hydraulic actuating pressure, motor means electrically connected thereto to move to a corresponding position, and means including connections from said feed back motor means and said remotely controlled motor means to said electrical contact means to relatively move them between their different operative positions to increase said hydraulic pressure and to reduce said hydraulic pressure to thus automatically establish and closely maintain said system hydraulic actuating pressure at any remotely selected value.

5. Electrically controlled means to adjust and to maintain the pressure in an hydraulic actuating system to any one of a number of desired settings comprising, reversible electric means to vary said system's hydraulic actuating pressure in either direction, feedback means connected to be responsive to sense any value of said hydraulic pressure, means including an electrical circuit having a remote portion adjustable to any one of a number of selected settings to fix the responsive value of another part of said circuit for said corresponding desired hydraulic pressure, and electrical control means for said hydraulic pressure varying means connected to be actuated by the relative values of said feedback means and said adjustable means to increase or decrease said hydraulic pressure to thus maintain it at said selected value.

6. An electric motor powered and electrically controlled hydraulic brake system comprising, electric motor operated means to variably supply the hydraulic actuating pressure in said system, electrical contacts relatively movable between different operative positions, means responsive to said hydraulic pressure in said system to relatively move said contacts, a control solenoid having a coil and spring bias plunger connected to relatively move said contacts, means to supply current to said coil, the plunger of said solenoid having a variable equilibrium position determined by the relative magnitudes of the opposing forces exerted on said plunger by said bias spring and by the magnetic field generated by said current in said coil, means including said contacts and a first relay to supply a larger current to actuate said motor in a direction to increase said hydraulic pressure and including a second relay to supply a larger current to actuate said motor in a reverse direction to decrease said hydraulic pressure, and a control rheostat connected in series with the coil of said solenoid to variably adjust the current in said coil to any selected value to determine the equilibrium position of said plunger and to thereby determine the corresponding magnitude of said selected hydraulic pressure.

7. An electrically controlled and electrically energized, hydraulic actuating system comprising control means including a remote and manually adjustable portion to select any one of a range of electrical values, balance means including means operatively connected to said control means to respond to said selected electrical value, said balance means including means to sense and respond to said hydraulic actuating pressure which is to be matched to said selected electrical value, reversible electric motor driven piston and cylinder means to rapidly and variably supply or decrease said hydraulic actuating pressure, and means connected to control said electric motor including said balance means to rapidly increase or to decrease said hydraulic pressure and to maintain it to match the said selected electrical value.

8. An electro-hydraulic unit comprising a reversible electric motor, a closely adjacent and reduction gearing connected screw and ball type of mechanical linear actuator, an hydraulic pressure supplying piston in a cylinder coaxial with said linear actuator and directly connected thereto, motor control means responsive to said hydraulic pressure and to a remotely supplied current value to match the said current value to the resulting pressure supplied by the amount of rotation of said motor and the corresponding amount of motion of said piston in either direction, and said unit including friction brake means to hold said piston in any selected position corresponding to a said remotely supplied current value.

9. A remote control hydraulic pressure supplying system comprising electric powered means to supply different values of hydraulic pressures, remote manually controlled means to supply different values of a current, and electric power controlling means including a member moved by said current and an interacting member moved by said resulting hydraulic pressure to sensitively match said resulting pressure to said remotely controlled current, said controlling means including relatively movable, low friction, guide surfaces of substantially the same static and dynamic friction.

10. An electro-hydraulic device for use in an hydraulic system having a remote control supplying different manually selected values of a current, said device comprising a reversible electric motor powered means having an inertia overrun in each direction to increase or to decrease the values of the resulting hydraulic pressures, and electric power controlling and reversing switch means therefor relatively movable by said remotely selected electric current and by said resulting hydraulic pressure to open said switch by said inertia overrun for each actuation thereof in each direction, said switch including guide surfaces of substantially the same static and dynamic frictional values.

11. An electro-hydraulic brake system comprising a reversible electric motor, a gear reduction connected thereto, a screw type of linear actuator connected thereto, an hydraulic pressure producing master cylinder having a piston connected to, and actuated by, said linear actuator, all operatively connected to produce different values of hydraulic pressure for different amounts of rotation of said motor in either direction and all having a sufficiently low friction and providing for an inertia overrun after actuation thereof in either direction, control means including a switch to control the operation of said motor in either direction and connected to be opened by said inertia overrun in either direction, and means to prevent excessive travel of said piston and said linear actuator.

12. An electro-hydraulic actuator system for remote electrical control, said system comprising a reversible electric motor operatively connected to an expansible chamber means to supply and to quickly increase or reduce an hydraulic actuating pressure in accordance with the number of motor turns in either direction of rotation thereof, motor reversing and controlling switch means operatively connected thereto and responsive to said hydraulic pressure and to a remotely selected electric current value, a remote control including a switch to initially control the on-off energization of said electric motor for further control by said switch means and including manually adjustable, variable means to supply any selected one of a plurality of selected current values, and electrical connections from said remote control to said motor and switch means providing two circuits for the initial control of said motor energization and for said selected values of current.

References Cited in the file of this patent

UNITED STATES PATENTS

| | | |
|---|---|---|
| 1,422,705 | Helfer | July 11, 1922 |
| 2,374,909 | Williams | May 1, 1945 |
| 2,380,575 | Brown | July 31, 1945 |
| 2,493,377 | Zeilman | Jan. 3, 1950 |
| 2,553,826 | Martin | May 22, 1951 |
| 2,888,875 | Buck | June 2, 1959 |
| 2,961,887 | Long | Nov. 29, 1960 |

UNITED STATES PATENT OFFICE
CERTIFICATE OF CORRECTION

Patent No. 3,048,976                                August 14, 1962

John D. Grigsby et al.

It is hereby certified that error appears in the above numbered patent requiring correction and that the said Letters Patent should read as corrected below.

In the grant, lines 1 and 2, for "John D. Grigsby, of Willoughby, and James R. Jeromson, Jr., of Willoughby Hill, Ohio," read -- John D. Grigsby, of Willoughby, and James R. Jeromson, Jr., of Willoughby Hill, Ohio, assignors to Thompson Ramo Wooldridge Inc., a corporation of Ohio, --; line 11, for John D. Grigsby and James R. Jeromson, Jr., their heirs" read -- Thompson Ramo Wooldridge Inc., its successors --; in the heading to the printed specification, lines 3 and 4, for "John D. Grigsby, Willoughby, and James R. Jeromson, Jr., Willoughby Hill, Ohio" read -- John D. Grigsby, Willoughby, and James R. Jeromson, Jr., Willoughby Hill, Ohio, assignors to Thompson Ramo Wooldridge Inc., a corporation of Ohio --.

Signed and sealed this 11th day of December 1962.

(SEAL)
Attest:

ERNEST W. SWIDER                                DAVID L. LADD
Attesting Officer                                   Commissioner of Patents